United States Patent [19]

Hoover

[11] Patent Number: 4,786,275
[45] Date of Patent: Nov. 22, 1988

[54] METHOD OF FORMING A COMPARTMENTED BAG

[75] Inventor: Gregory A. Hoover, Hartsville, S.C.

[73] Assignee: Sonoco Products Company, Hartsville, S.C.

[21] Appl. No.: 44,545

[22] Filed: May 1, 1987

Related U.S. Application Data

[63] Continuation-in-part of Ser. No. 906,456, Sep. 16, 1986, Pat. No. 4,696,403.

[51] Int. Cl.$^4$ .................. B31B 23/18; B31B 27/64
[52] U.S. Cl. ........................... 493/194; 493/203; 493/238; 493/341; 493/346; 493/926; 493/931; 206/428; 206/602; 383/8; 383/38
[58] Field of Search ........... 493/190, 194, 198, 199, 493/230, 233, 238, 920, 926, 931, 203, 341, 346

[56] References Cited

U.S. PATENT DOCUMENTS

| | | | |
|---|---|---|---|
| 3,016,806 | 1/1962 | Schoen et al. | 493/931 |
| 3,069,978 | 12/1962 | Hoeppner | 493/194 |
| 3,607,521 | 9/1971 | Suominen | 493/926 |
| 4,318,768 | 3/1982 | Johnson | 156/494 |
| 4,332,578 | 6/1982 | van der Meulen | 493/197 |
| 4,368,051 | 1/1983 | Lehmacher | 493/11 |
| 4,526,565 | 7/1985 | Hummel et al. | 493/196 |

OTHER PUBLICATIONS

Informational Pamphlet "Welding Slit Seal System" AMI.

Primary Examiner—Frederick R. Schmidt
Assistant Examiner—William E. Terrell
Attorney, Agent, or Firm—Dennison, Meserole, Pollack & Scheiner

[57] ABSTRACT

A method of forming a severable compartmented T-shirt bag comprising heat welding overlying lengths of a flattened tubular web of thermoplastic material centrally therealong to define a compartment to each side of the heat welding and a side edge seam for each compartment, slitting the web material between the compartments and formed seams, and reengaging the seams and forming a tack joinder therebetween to define a line of severance. The method also including the steps of transversely seaming the lengths of web material into individual bag units and forming a central cutout area in each bag unit to define a bag mouth with a handle to each side of the severance line.

2 Claims, 2 Drawing Sheets

METHOD OF FORMING A COMPARTMENTED BAG

BACKGROUND OF THE INVENTION

This is a continuation-in-part of Ser. No. 906,456 U.S. Pat. No. 4,696,403; Gregory A. Hoover, filed Sept. 16, 1986; for Bottle Bag.

The invention is generally concerned with the bagging of glass containers, primarily bottles, wherein great care must be taken to avoiding direct contact between the bagged bottles such as might cause chipping or breakage. While the problem is not particularly significant in a grocery store environment wherein the glass containers for various foodstuffs use relatively thick glass and, in the bagging thereof, can normally be cushioned within other foodstuffs to avoid direct glass to glass contact, the problem is more acute in liquor stores and the like wherein the bulk of the products dispensed are in glass bottles. As such, while not limited thereto, it is contemplated that the present invention find particular utility as a bagging means or container for liquor bottles.

Under current practice, when two or more bottles are to be carried within a carrier or bag, the bottles are separated within the bag by individually wrapping the bottles prior to insertion in the bag, providing extra bags to receive the individual bottles, or by inserting cardboard dividers or the like between the bottles. While such means are effective to keep the bottles from hitting each other and breaking, the cost of the extra bags, dividers, and the like can be high, particularly in liquor stores wherein substantially every sale will entail the use of substantial packaging materials in addition to the carrying bag itself.

The problem of maintaining bottle separation within a carrying bag is recognized in the following patents wherein proposed solutions have involved the provision of rather elaborate permanent or removable partition structures:

| | |
|---|---|
| 1,983,418 | Thurmer |
| 2,089,297 | Read et al |
| 4,428,484 | Rattay et al |

SUMMARY OF THE INVENTION

The bag construction of the present invention is unique in providing for bottle separation without requiring additional materials, separate partitions, extra bags, or the like.

Basically, the bottle carrier of the present invention comprises a flexible bag, preferably of autogenously bondable synthetic resin material as in the commonly used plastic or thermoplastic grocery sack, wherein the front and rear walls of the bag are bonded together along the vertical center line thereof. When formed in this manner, a pair of upwardly opening isolated compartments are defined toward each side of the bag. The typical thermoplastic grocery bag normally incorporates a pair of upwardly extending handles, defining what is frequently referred to as a "T-shirt" grocery bag. The defined compartments of the liquor bag of the present invention will each generally underlie one of the handles for a direct support of the load therein. This is particularly desirable to avoid a load imbalance.

It is also contemplated that provision be made for vertically severing the bag to separate the compartments, as would be desired in those instances where only a single bottle is to be bagged. In such cases, the provision for a handle in association with each of the compartments is particularly significant in defining a self-contained carrier unit.

Provision for separation of the compartments of a bag will normally be provided by incorporating a severance line or line of weakness, such as a line of perforations, vertically along the bonded area between the front and rear walls of the bag and centrally of the bonded area whereby upon a severing of the compartments, a bonded edge is retained along each compartment. In this manner, a complete carrier is retained.

It is a particularly significant object of the invention to provide a procedure and to so modify a conventional dual handle plastic grocery bag as to convert the bag into a compartmented bag with a separate handle for each compartment and a severance line therebetween. Thus, the conventional T-shirt bag, so modified, can at the option of the user be divided into separate handle bag units.

It will be recognized that the significant advantages of a compartmented bag capable of being physically divided into multiple bag units with individual handles is achieved without the necessity of additional materials, internal partitions, or the like. In addition, assuming bags of thermoplastic material formed in the manner of the known plastic grocery bag, the formation of the bag of the present invention can be effected on standard manufacturing equipment with minor modifications to accommodate, as an example, a central vertical heat seaming or sealing of the front and rear walls of the bag together, in conjunction with the defining of means forming a severance line. This can comprise a line of perforations centrally along the seam. However, in a preferred embodiment, the conventional thermoplastic handle or T-shirt bag has the walls thereof vertically slit centrally between the handles by a heated implement which simultaneously heat welds the edges of the front and rear panels together to each side of the slit to form a pair of side edge seams and define a pair of separate handled bag units. The pair of edge seams are immediately rejoined to define a dual compartment bag by bringing the side edge seams together prior to cooling and while still sufficiently tacky to adhesively bond to each other. The joinder seam thus formed will be inherently weaker than the two formed heat welded edges for a selective severing of the formed bag into two bag units.

As a manufacturing procedure, the central seaming and the formation of the severance line in the bag walls will normally be effected in the web of material prior to a defining of the individual bags by a cross-seaming of the bag walls and a cutting of the bag mouths between the handles.

Additional objects and features of the invention will be appreciated as the details of construction and manner of use are more fully hereinafter described and claimed.

DESCRIPTION OF THE PREFERRED EMBODIMENTS

Figure 1:
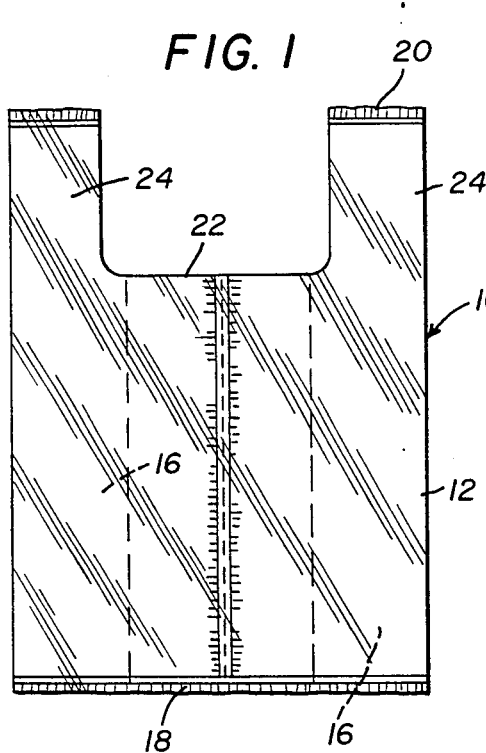
FIG. 1 is a plan view of the bag of the present invention.

Referring now more specifically to the drawings, reference numeral 10 designates the carrier or bag of the invention. As with known bags, the bag 10 can conveniently be fabricated from a tube of thermoplastic material sequentially gusseted, flattened and heat sealed at the opposed upper and lower ends.

The formed bag will thus include opposed overlying front and rear panels defining front and rear walls 12 and 14 with integral outwardly expandable side walls or gussets 16, a heat sealed closed bottom or lower edge 18 and a heat sealed top edge 20. As desired, the basic configuration of the bag 10 can be formed without the side gussets with the sides of the bag defined by a direct heat sealing of the side edges of the front and rear walls 12 and 14 to each other.

The bag 10 is basically a conventional "T-shirt" or handle bag. As such, the bag 10 is cut away inwardly and centrally through the heat sealed upper edge 20 thereof for a minor portion of the height of the bag to define both an open bag mouth 22 and a pair of laterally opposed handles 24. As will be appreciated from the drawings, the handle-defining cut will extend through the inner extremities of the upper portions of the opposed gussets 16 to allow for an opening of the formed handles 24. Each of the handles 24 is in turn formed of integrally upwardly extending portions of the front and rear bag walls reinforced by the inwardly underlying upper portions of the gussets 16.

The bag construction thus far described is generally conventional. The bag 10 of the present invention differs from the conventional thermoplastic grocery bag in that the front and rear walls 12 and 14 are directly bonded to each other vertically along a seal or seam 26 extending between the open loading mouth 22 of the bag and the sealed lower edge or bottom 18 thereof. The front and rear walls 12 and 14 are preferably autogenously bonded to each other, such as by heat sealing, a step which can be easily provided for during the manufacture of the bag.

The central seaming of the front and rear walls 12 and 14 of the bag to each other defines a pair of laterally adjacent upwardly opening compartments 28, each directly accessible through the open mouth 22 of the bag, possibly in conjunction with an outward spreading of the overlying corresponding handle 24.

Figure 2:
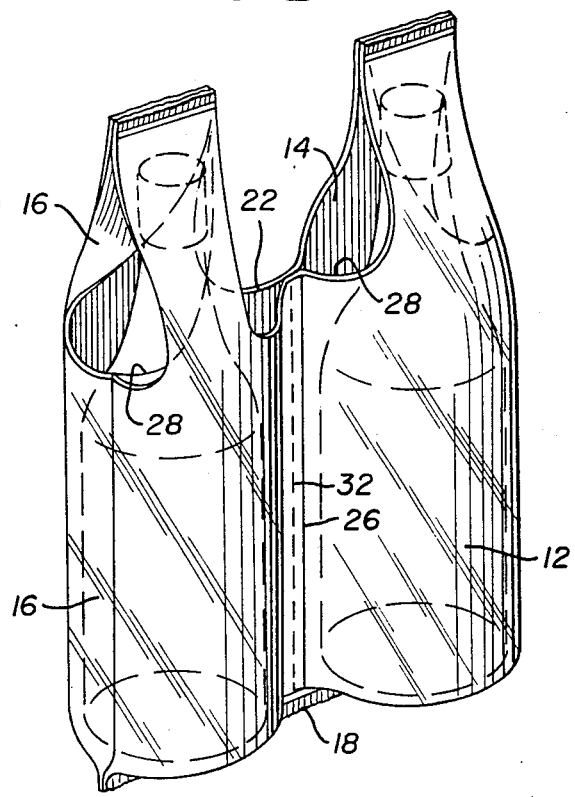
FIG. 2 is a perspective view of the bag with a pair of bottles supported therein.

As previously indicated, the bag 10 of the invention is particularly adapted for the accommodation of a pair of bottles, each received in one of the compartments. When so positioned, and as illustrated in FIG. 2 of the drawings, the bottles are segregated from each other, thus avoiding direct contact therebetween and avoiding any breakage which might be attributed to such contact. The bag 10, when loaded as illustrated in FIG. 2, can now be readily carried in the manner of a conventional plastic grocery bag by merely an inward flexing of the handles 24 toward each other for convenient grasping within one hand.

Figure 4:
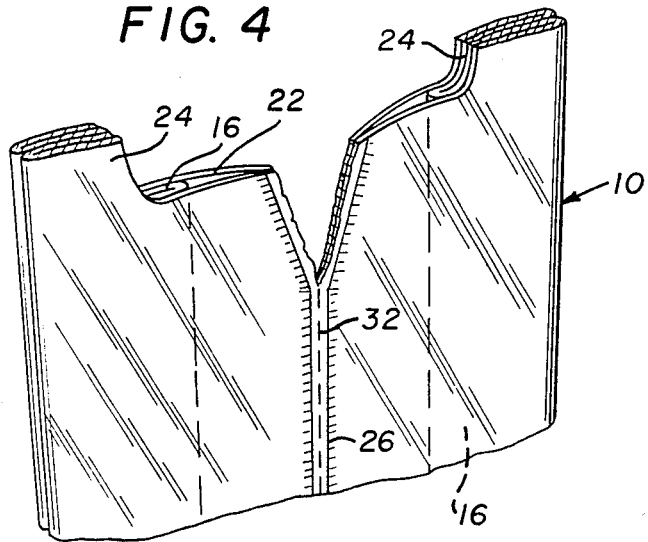
FIG. 4 is a perspective view of a single compartment unit completely severed from the bag and with a bottle therein.
Figure 3:
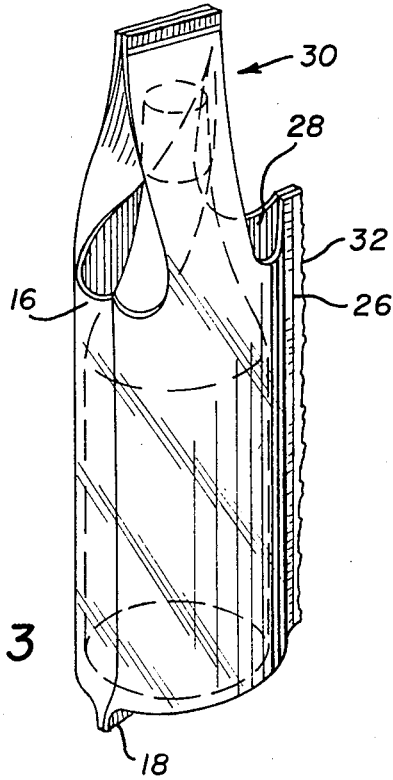
FIG. 3 is a partial perspective view illustrating the manner of severing the individual compartments while maintaining a seamed edge along each compartment.
Figure 5:
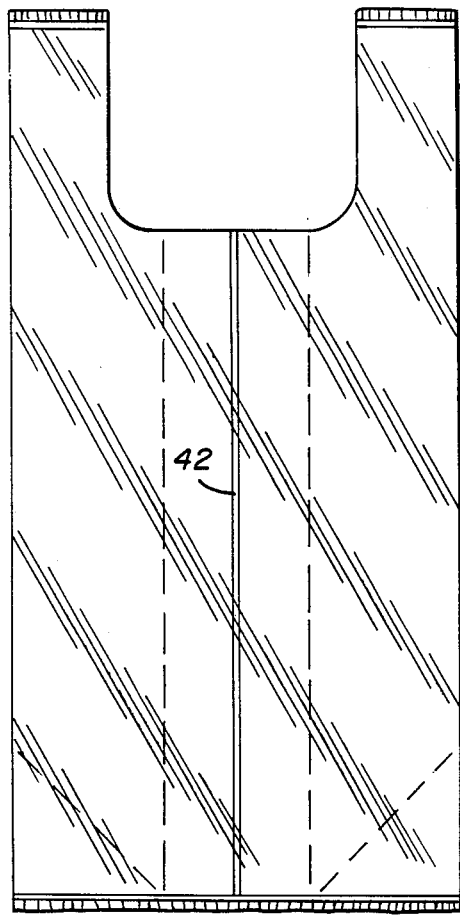
FIG. 5 is a plan view of the bag illustrating a variation of the central seams and severance line construction.
Figure 6:
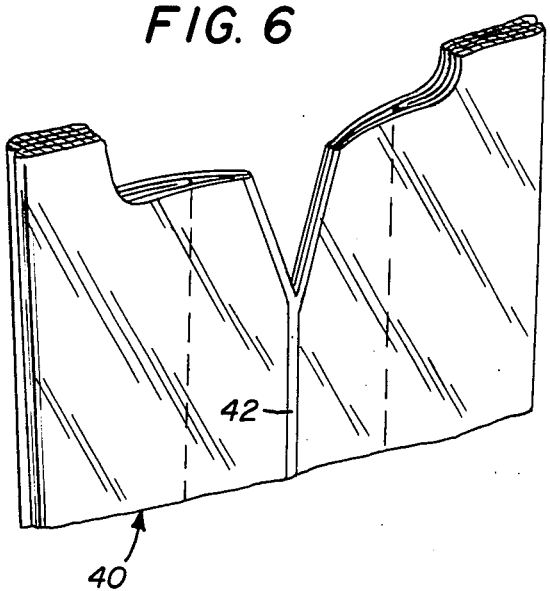
FIG. 6 is a partial perspective view illustrating the severing of the bag of FIG. 5 into separate bag units.

An additional and particularly significant feature of the invention is the provision for a severing of the two formed bag compartments 28 from each other to provide a carrier or bag unit 30, as illustrated in FIG. 4, to accommodate a single bottle. The severance of the bag 10 into two separate bag units 30 can be provided for by defining a line of severance or weakness 32 vertically along the heat seal or seam 26. This line of severance 32, which may consist of aligned material-weakening perforations, will extend centrally along the seam 26, with the seam 26 being of sufficient width to maintain a positive edge seal along each of the bag units 30 upon a severance thereof. In this manner, the integrity of each of the severed bag units 30 is maintained.

As with the formation of the seam or heat seal 16, the formation of the line of weakness or perforations can be easily effected during bag manufacture through relatively minor equipment modification. As an alternative to providing for a single wide heat seal capable of being centrally perforated or severed, a pair of lateraly spaced separate heat seals or seams can be provided with the line of weakness therebetween.

As will be noted particularly in FIG. 4, each of the severed carrier or bag units 30 incorporates one of the handles 24 and defines a self-contained handled carrier or bag for both facilitating a carrying of the bottle and cooperating therewith in confining the bottle and, through the flexible nature of the material of the bag and the weight of the bottle, providing for a intimate retention of the bottle within the bag unit. It will also be recognized that the flexible nature of the bag, either alone or in conjunction with the expanding side gusset 16, will tend to centrally locate the bottle, and hence the load, below the handle 24 to enhance the convenience of the carrier unit.

A variation of the bottle bag and the manner of converting a standard T-shirt bag to such a bottle bag is illustrated in FIGS. 5-8.

The bag 40, which may include angle seals at the bottom corners for additional strength, is formed, similar to the bag 10, as a standard T-shirt or handle bag modified by a vertically joining of the front and rear panels thereof centrally between the handles with the joinder including a full length severance line 42. The resultant compartmented bag construction utilizes the conventionally formed dual handle bag by a central seaming thereof to provide both separate handled compartments and, upon severing, independent handled bag units with heat sealed side edge seams.

Figure 8:
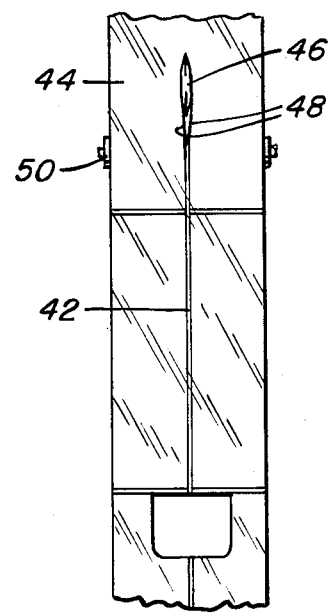
FIG. 8 is a schematic plan of the travel of a web of bag material as it is slit, tack joined and formed into individual bag units with handles.
Figure 7:
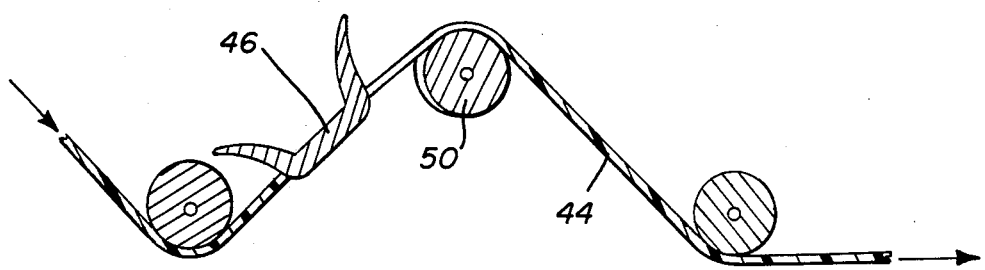
FIG. 7 is a schematic illustration of the method involved in forming a dual handle bag into a severable dual compartment bag.

Noting FIGS. 7 and 8, and assuming formation of the bags from a continuous tubular web 44 comprising a pair of continuous overlying lengths of web material, the seaming is preferable effected as the tubular web travels and immediately prior to a defining of the handles and a cross-seaming of the web 44 into individual bags or bag units.

Basically, the flattened tubular web 44 is slit by a hot knife 46 which simultaneously forms a pair of heated sealed side edge seams 48 between the overlying panels of the bag material. The formed individual seams 48 are momentarily separated by the knife and subsequently engaged with each other while still tacky from the heat of the knife. The engagement of the tacky edge seams with each other instantly bonds the edges in a join which is inherently weaker than the edge seams, thus providing the desired line of severance therebetween.

One manner of engaging the tacky edges is suggested in FIG. 7 and comprises an underlying or base bowed roller 50 over which the web 44 is tensioned to encourage an engagement of the tacky edges. The bowed roller 50 is rotationally adjustable to allow for a degree of adjustment in the reconnect pressure.

When, as suggested in FIGS. 7 and 8, the vertical seaming and the provision of the severance line is effected in the tubular web prior to actually defining the bags, the seamed web of material can, with the formed continuous adjacent compartments, be rolled and stored for later processing into bags.

From the foregoing, it will be appreciated that a novel utilization of a conventional T-shirt or handle bag has been described wherein, through a unique modification of the bag, the bag has been compartmented and adapted for severance into two independent bag units, each with one handle of the original T-shirt bag. The bag, while requiring no more material than that in a conventional plastic grocery bag, is uniquely compartmented and adapted for the accommodation of multiple bottles in a manner whereby the bottles are segregated from each other within a single carrier to avoid any potential for breakage resulting from direct bottle contact. The bottle segregation results from a direct seaming of the front and rear walls of the bag to each other vertically therealong and centrally between the handles. With regard to the intimate engagement and direct seaming of the front and rear walls to each other, as noted particularly in FIG. 2, such a relationship provides for a gradual reduction in the spacing between the front and rear walls of an expanded bag toward the central seam. This in turn will actually tend to outwardly space the bottles from the central seam and thus provide a further cushioning effect between the bottles above and beyond that resulting from the width of the seam itself and the front and rear wall material therein.

The ability to sever the bag into separate handled bag units for single bottles is significant in accommodating purchases of single bottles without necessitating either the specific provision of smaller bags capable of accommodating single bottles, or the use of a larger-than-necessary bag normally adapted to accommodate more than one bottle.

I claim:

1. A method of forming a severable compartmented T-shirt bag from a tubular web comprising a pair of continuous overlying lengths of web material, said method comprising the steps of longitudinally heat welding the lengths of web material together centrally therealong to define a compartment to each side of the heat welding with each compartment having a side edge seam formed along the edge thereof by the heat welding, said heat welding including slitting the lengths of web material between said compartments and the formed seams thereof and defining heat sealed edges along said seams, forming a line of severance along and between said seams for selective separating of the compartments into separate units, said severance line being formed by reengaging said seams along said heat sealed edges prior to a cooling thereof to form a tack joinder therebetween; and including the steps of transversely seaming said lengths of web material into individual bag units and forming a central cutout area for each bag unit, to define a bag mouth with a handle to each side of said severance line.

2. The method of claim 1 wherein the steps of transversely seaming said lengths of web material and forming a central cutout area follow the formation of said line of severance.

* * * * *